United States Patent [19]

Kutaguchi

[11] 4,026,600
[45] May 31, 1977

[54] PLASTIC SADDLE FOR BICYCLE

[75] Inventor: Katuhiko Kutaguchi, Sakai, Japan

[73] Assignee: Taihei Kogyo Co., Ltd., Japan

[22] Filed: July 10, 1975

[21] Appl. No.: 594,753

[52] U.S. Cl. .......................... 297/214; 297/DIG. 2; 297/195

[51] Int. Cl.² .......................................... B62J 1/18

[58] Field of Search .......... 297/214, 195, 218, 219, 297/223, 229; 85/DIG. 2

[56] References Cited

UNITED STATES PATENTS

| | | | |
|---|---|---|---|
| 2,209,403 | 7/1940 | Kittiner | 85/DIG. 2 |
| 2,300,379 | 10/1942 | Faulhaber | 297/214 X |
| 3,756,653 | 9/1973 | Worley | 297/214 |
| 3,758,154 | 9/1973 | Kitaguchi | 297/214 |
| 3,844,611 | 10/1974 | Young | 297/214 |
| 3,856,348 | 12/1974 | Bird | 297/214 X |

FOREIGN PATENTS OR APPLICATIONS 210,844  2/1924  United Kingdom .............. 297/214

*Primary Examiner*—James T. McCall
*Attorney, Agent, or Firm*—Armstrong, Nikaido & Marmelstein

[57] ABSTRACT

Plastic saddle comprising a saddle base made of a rigid plastic material and having a downwardly extending flange along its entire periphery, the opposing portions of the flange approximately at the midportion of length of the saddle base being spaced apart by a reduced transverse distance to provide constricted portions; an arch-shaped base support integral with the bottom of the saddle base and comprising a pair of strip-like supporting members formed each in its side with stepped portions in opposing relation to the constricted portions of the flange respectively, the supporting members being interconnected at the rear ends, at the stepped portions and at the foremost ends thereof by connectors integral therewith; a shock-absorbing elastic member adhered to the top of the saddle base; and a saddle cover made of a soft plastic material and fitted over the elastic member, the saddle cover having along its entire periphery a gripping flange fitted over the flange of the saddle base in gripping engagement therewith. The gripping flange is retained in position against unfolding by the cooperation of the constricted portions of the flange of the saddle base and the stepped portions of the supporting members.

3 Claims, 4 Drawing Figures

PLASTIC SADDLE FOR BICYCLE

BACKGROUND OF THE INVENTION

The present invention relates to improvements in plastic saddles for bicycles, and more particularly to improvements in a saddle comprising a saddle base and strip-like support members integral therewith to support the base.

Saddles are mounted on the seat post of bicycle approximately in horizontal position. Plastic saddles have recently been introduced into use which comprise a saddle base and a pair of strip-like support members for supporting the base, both the base and support members being made or a rigid plastic material.

Such plastic saddles are grouped into two types: those made by molding the saddle base and the pair of support members separately and assembling them together with bolts and nuts, and those made by molding the saddle base and the support members integrally. Each of these types has its inherent advantages and disadvantages. As disclosed by the present inventor in U.S. Pat. No. 3,758,154, the saddle of the former type has the advantages that the saddle base and the pair of support members are easily and accurately moldable each in accordance with its function and that the molding procedure does not require much skill. However, because the pair of strip-like support members are fastened to the rear surface of the saddle base with screws, the saddle necessitates an increased number of assembling steps, the fastened portions are prone to loosening when subjected to shaking and the exposed fastening members are unsightly and reduce the commercial value. On the other hand, the saddle of the latter type in which the strip-like support members are integral with the saddle base has the advantages of eliminating the necessity of fastening them together, reducing the number of assembling steps and increasing the commercial value, whereas the saddle of this type requires skill for molding since the saddle base and support members have different functions and are therefore different in shape. However, with great improvements in molding technique in recent years, the latter integral type is advantageous for mass production.

With either of the types described, there is a common problem. The arch-shaped strip-like support members integral with or fastened to the rear surface of the saddle base are deformed in directions away from each other by the load of the rider on the saddle or due to shakes during cycling and, during years of use, the deformation leads to fatigue of the material, reducing the durability of the saddle. Although the prior art described employs a plate for interconnecting the rear portions of the pair of the support members to prevent deformation or deflection, with the plate alone it is still difficult to fully assure the desired function.

Because of the particular properties of the material, plastic saddles possess an ability to absorb shaking. Accordingly, the large distance between the abutments of the support members on the saddle base, i.e. the long span involved in the arch-shaped support members of the prior art, permits marked flexure of the saddle base, imparting an excessive shake absorbing ability to the saddle base. Consequently, there arises the necessity of providing reinforcing longitudinal and transverse ribs on the rear surface of the base to reduce the commercial value.

Saddles further include a shock-absorbing elastic member adhered to the top of the base and saddle cover covering the elastic member to provide a saddle top. As disclosed in the aforesaid prior art, the conventional saddle cover is fastened to the saddle base by a suitable number of L-shaped pawl members attached to the base. The saddle cover is provided with a drawable iron wire. After the periphery of the saddle cover is folded over the periphery of the saddle base, the iron wire is pulled, and the pawl members are bent over the periphery of the cover to clamp the cover. Thus the cover must be fitted over the base entirely by manual work, whilst depending on the degree to which the iron wire is pulled, the opposite sides of the cover at the rear portion of the saddle may possibly be wrinkled, seriously impairing the commercial value of the saddle.

SUMMARY OF THE INVENTION

An object of this invention is to provide a synthetic resin saddle of the type comprising a saddle base and a pair of strip-like support members integral with the saddle base, the saddle including a saddle cover shaped in conformity with the saddle shape and fittable over the saddle base and around the downwardly extending flange of the saddle base, such that the peripheral flange of the saddle cover is retained in position against possible unfolding by the cooperation of the downwardly extending flange of the base and the pair of the support members, the saddle thus entirely eliminating the necessity of using conventional clamping members.

Another object of this inventon is to provide a synthetic resin saddle comprising a saddle base and arch-shaped strip-like support members formed integrally with the base on its rear surface, the support members serving to reinforce the saddle base while permitting the saddle base to retain a satisfactory shake absorbing ability.

Another object of this invention is to provide a durable saddle of the type described in which the arch-shaped strip-like support members integral with the saddle base will in no way be forced away from each other even when the saddle is subjected to an external force, the support members thus assuring the desired shake absorbing ability of the saddle base and at the same time reinforcing the base.

For a better understanding of this invention, an embodiment of the invention will be described below in detail with reference to the accompanying drawings.

DESCRIPTION OF THE PREFERRED EMBODIMENT

Figure 1:
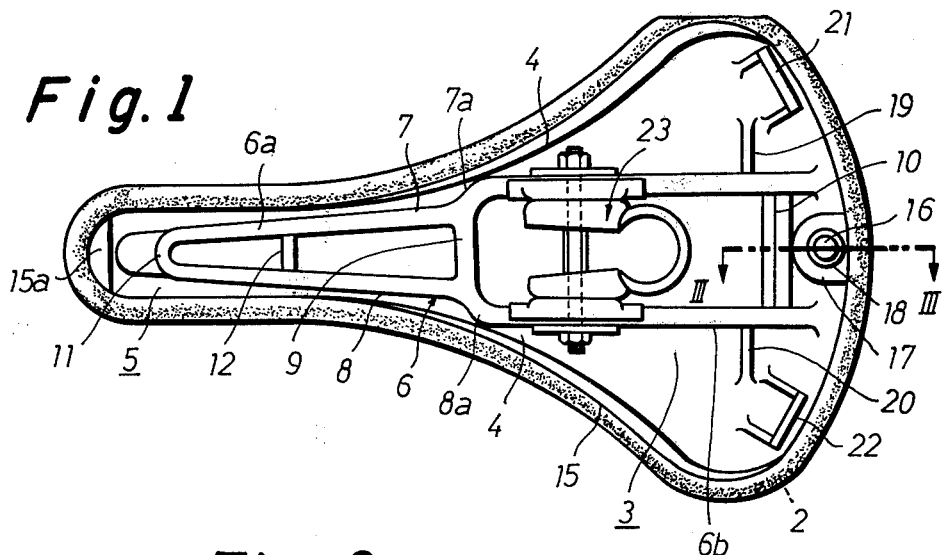
FIG. 1 is a bottom view showing an embodiment of this invention.
Figure 2:
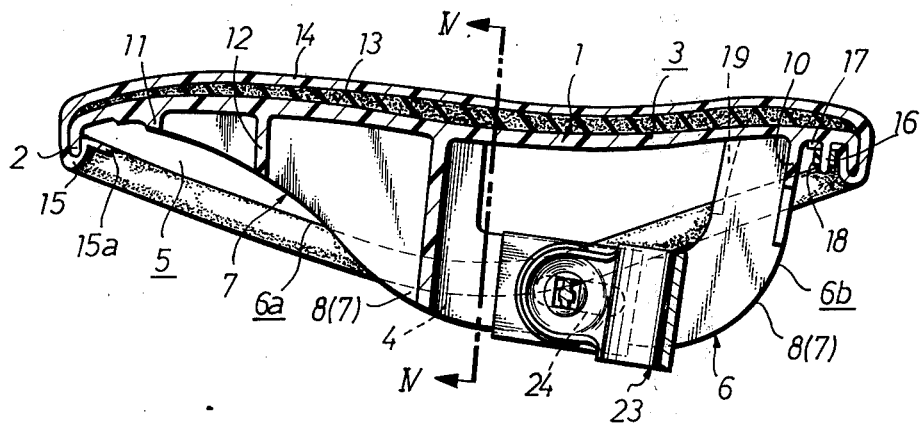
FIG. 2 is a side elevation in section showing the same.

FIGS. 1 and 2 show a saddle base 1 made of a rigid plastic material such for example as nylon 6. The saddle base 1 is gently curved in its longitudinal direction and has a downwardly extending flange 2 along the periphery. The rear portion of the base 1 extends laterally outward to provide a portion 3 which serves substantially as a seat for the rider. At the approximate midportion of the length of the base 1, the transverse distance between the opposing portions of the flange 2 is reduced to provide constricted portions 4, from which the opposing flange portions extend longitudinally of the base as spaced apart from each other by a distance at least not larger than the reduced distance to define a front portion 5 of the base 1. As seen in FIG. 1, the flange 2 extends along the entire periphery of the base 1, substantially surrounding the rear surface of the base 1. The flange 2 extends downward greatly at the constricted portions 4 as shown in FIG. 2, and the base 1 is in the form of an inverted U-shaped at this part (see FIG. 4). A base support 6 comprises a pair of strip-like supporting members 7 and 8 integral with the bottom of the base 1. The base support 6 includes an upwardly slanting front part 6a and an abruptly upwardly slanting rear part 6b and is substantially arch-shaped (see FIG. 2).

At the approximate midportion of length of the base support 6, the strip-like supporting members 7 and 8 have stepped portions 7a and 8a. The part 6a of the base support 6 to the front of the stepped portions 7a and 8a is integral with the bottom of front portion 5 of the base 1, has a reduced width and reinforces the portion 5. The part 6b of the base support 6 to the rear of the stepped portions 7a and 8a has a larger width, extends rearward and is integral at two positions with the bottom of the rear portion of the base 1. The rear part 6b is substantially in the form of an arch as illustrated in FIG. 2. To prevent expansion or contraction of the base support 6, namely inward or outward deformation of supporting members 7 and 8 relative to each other, these members are interconnected by connectors 9, 10 and 11 at the stepped portions 7a, 8a, at rear ends and at the foremost ends, respectively. The connectors are integral with the saddle base 1. Approximately at a midportion between the connectors 9 and 10, the supporting members 7 and 8 are connected together as at 12. The front part 6a of the base support 6 is in the form of a box as shown in FIG. 1 and perfectly reinforces the front portion 5 of the saddle base 1.

Since the base support 6 extends approximately from the midportion of the saddle base 1 to the rear portion thereof, assuming the shape of an arch at the position under the portion 3 which serves substantially as the seat for the rider, the support 6 prevents flexure or bending of the base 1 to the greatest possible extent, while ensuring the shake-absorbing ability of the base 1.

As seen in FIG. 2, a shock-absorbing elastic member 13 such as sponge or the like is adhered to the top of the saddle base 1. The elastic member 13 is fully useful even if it is relatively thin because the base 1 and support 6 are both made of plastic material. The member 13 will then serve to improve the appearance of the saddle.

Fitted over the elastic member 13 is a saddle cover 14 which is made of soft plastic material such as soft polyvinyl chloride resin. The cover 14 is shaped substantially in conformity with the saddle shape, namely the shape of the saddle base 1, and has integral therewith a gripping flange 15 along its entire periphery. As illustrated in FIG. 2, the gripping flange 15 includes an inwardly bent portion having a U-shaped cross section and is fitted over the flange 2 of the saddle base 1 to grip the flange 2 with its elastic force. The saddle cover 14 is fitted in place first from its front end. To render the cover 14 smoothly fittable, it is provided with a piece 15a to be nipped by the fingers (see FIGS. 1 and 2). While being held open by means of the piece 15a, the flange 15 is placed over the flange 2 progressively from the front of the base 1 rearward and is finally fitted over the entire length of the flange 2 in gripping engagement therewith by virtue of the elastic force of the flange 15.

Figures 3, 4:
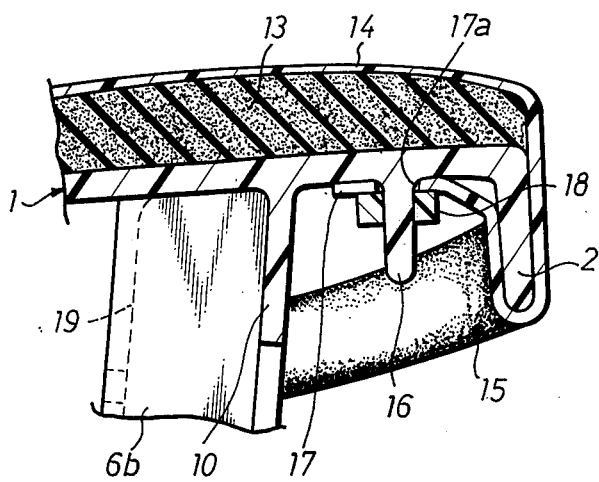
FIG. 3 is an enlarged view in section taken along the line III—III in FIG. 1.
FIG. 4 is a view in section taken along the line IV—IV in FIG. 2.

Approximately at the midportion of length of the flange 2, the constricted portions 4 oppose the outside walls of the stepped portions 7a and 8a of the base support 6 to form narrow spaces therebetween as illustrated in FIGS. 1 and 4, so that the flange 15 gripping the flange 2 with its elastic force is retained in position against disengagement or unfolding by the cooperation of the constricted portions 4 and the outside walls of the stepped portions 7a and 8a.

Whereas unfolding or disengagement of the gripping flange 15 is unlikely to take place at the front and rear portions of the saddle because the saddle is curved at these portions, the disengagement is very likely to occur at the longitudinal portions which is nearly linear. Accordingly, at the midportion of the length of the base, the constricted portions 4 and stepped portions 7a and 8a are provided for cooperation to effectively eliminate unfolding or disengagement of the gripping flange 15.

Further according to this invention, the saddle base 1 is provided, integral with its rear bottom portion, with a pin 16 on the longitudinal center line thereof as shown in FIG. 3. The length of the pin 16 is smaller than the amount of projection of the downwardly extending flange 2.

On the other hand, in opposing relation to the pin 16, the gripping flange 15 of the saddle cover 14 is provided, inside thereof, with a tongue 17 integral therewith and having a pin bore 17a. The pin 16 is inserted into the pin bore 17a in the tongue 17, and a plastic ring 18 is forcibly fitted onto the pin 16 to clamp the tongue 17 by the ring 18 and the bottom of the saddle base 1. Thus through the cooperation of the pin 16, tongue 17 and ring 18, the saddle cover 14 can be fitted over the saddle base 1 without any possibility of removal or unfolding. Moreover, these means render the cover very simple and easy to fit in place. Of course, suitable numbers of pins 16 and of tongues 17 may be provided as desired.

In order to positively eliminate expansion and contraction of the base support 6, it is advantageous to provide a pair of reinforcing members 19 and 20 on the opposite sides of supporting members 7 and 8 at positions close to their rear ends, the reinforcing members being integral with the supporting members and with the saddle base. Furthermore, a pair of attachment blocks 21 and 22, formed integrally with the base 1, are positioned outwardly of the reinforcing members 19 and 20 on the opposite sides thereof (see FIG. 1). The upright portions of the blocks 21 and 22 have bores for attaching a bag or like article to the blocks. The blocks also serve to reinforce the saddle base 1.

A clamping member 23 for mounting the saddle on the seat post of bicycle is fixed to the substantially arch-shaped supporting members 7 and 8 in usual manner. With the provision of slots 24 formed in the supporting members 7 and 8 longitudinally thereof, the position of the clamp member 23 is adjustable.

As will be apparent from the foregoing description, the base support 6 comprising the pair of supporting members 7 and 8 chiefly supports the vertically acting load of the rider on the saddle. Because the front part 6a of the support 6 is in the form of a box and integral with the front portion 5 of the base 1, with the rear part 6b of the support 6 also formed integrally with the base 1 at two positions, the support 6 is fully capable of withstanding the load. Under the vertical load and due to shaking, the pair of supporting members 7 and 8 tend to be deformed outward or inward relative to each other, but the connectors 11, 9 and 10 integrally interconnecting the supporting members 7 and 8 at the front end, middle and rear end of the base support 6 completely eliminate such deformation which would lead to deformation of the saddle base 1. Although the load of the rider mainly acts on the seat portion 3 of the saddle, the seat portion is supported, at the front and rear thereof, by the arch-shaped base support 6 which involves a short span. Consequently, the arch-shaped support 6 precludes excessive flexure of the saddle base 1. Because the saddle is wholly made of a plastic material, the saddle has optimum cushioning properties despite the short span of the support 6.

The construction in which the gripping flange 15 of the saddle cover 14 is fitted over the flange 2 of the saddle base 1 with the elastic force of the flange 15 itself entirely obviates the necessity of using pawl members and wire which are usually needed. The saddle can therefore be assembled readily and has an improved commercial value. The flange 2 of the saddle base 1 and the base support 6 coact to prevent unfolding or disengagement of the gripping flange 15, while the fastening means comprising the pin 16, tongue 17 and ring 18 is useful in perfectly fitting the saddle cover 14 over the saddle base 1.

What is claimed is:

1. A plastic saddle for a bicycle said saddle comprising:

a saddle base, having front and rear portions, said base including a downwardly extending flange along the entire periphery thereof, wherein the distance between the portions of said flange on each side of said base is reduced towards the front portion of said base;

a pair of arched shaped base support members integral with the bottom of said base each said base support member comprising a front portion gradually slanting upward towards the front of said base, a rear portion abruptly slanting upward towards the rear of said base, and a step portion interconnecting said front and rear portions of said support members, connecting means integral with said support members for interconnecting said support members thereby reducing deformation thereof, a shock absorbing elastic member positioned on top of said base; and a saddle cover fitted over said elastic member, said saddle cover including a gripping means along the periphery thereof, said gripping means being fitted over the flange of said base and gripping the flange of said base, and wherein the distance between the stepped portion of said support members and the flange of said base is such that said gripping means is held therebetween thereby preventing said gripping means from disengaging said flange.

2. The plastic saddle of claim 1 wherein said connecting means comprises a first connecting member interconnecting the rear portions of said support members, a second connecting member interconnecting the stepped portions of said support members, and a third connecting member interconnecting the front portions of said support members.

3. The plastic saddle of claim 1 wherein said base includes a pin on the bottom thereof and wherein said gripping means of said saddle cover includes a tongue, said tongue being positioned to engage said pin and further including a ring member fitted on said pin over said tongue for holding said tongue in engagement with said pin.

* * * * *